United States Patent
Kawasaki et al.

(10) Patent No.: US 9,329,706 B2
(45) Date of Patent: *May 3, 2016

(54) DISPLAY DEVICE WITH TOUCH PANEL, EVENT SWITCHING CONTROL METHOD, AND COMPUTER-READABLE STORAGE MEDIUM

(71) Applicant: RICOH COMPANY, LTD., Tokyo (JP)

(72) Inventors: Yuichi Kawasaki, Kanagawa (JP); Katsuyuki Omura, Tokyo (JP); Takanori Nagahara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/519,375

(22) Filed: Oct. 21, 2014

(65) Prior Publication Data

US 2015/0035782 A1 Feb. 5, 2015

Related U.S. Application Data

(63) Continuation of application No. 13/416,668, filed on Mar. 9, 2012, now Pat. No. 8,907,907.

(30) Foreign Application Priority Data

Mar. 14, 2011 (JP) ................................. 2011-055228

(51) Int. Cl.
*G06F 3/0354* (2013.01)
*G06F 3/042* (2006.01)
*G06F 3/041* (2006.01)
*G06F 3/0488* (2013.01)

(52) U.S. Cl.
CPC ............ *G06F 3/03545* (2013.01); *G06F 3/041* (2013.01); *G06F 3/0423* (2013.01); *G06F 3/04883* (2013.01)

(58) Field of Classification Search
CPC ... G06F 3/041; G06F 3/0423; G06F 3/04883; G06F 3/03545
See application file for complete search history.

(56) References Cited

U.S. PATENT DOCUMENTS 6,326,954 B1  12/2001  Van Ieperen
7,486,282 B2   2/2009  Russo
(Continued)

FOREIGN PATENT DOCUMENTS

CN  1797305 A   7/2006
CN  101887327 A  11/2010
(Continued)

OTHER PUBLICATIONS

Office Action issued Feb. 12, 2014 in Japanese Patent Application No. 2011-055228.

(Continued)

*Primary Examiner* — Latanya Bibbins
(74) *Attorney, Agent, or Firm* — Oblon, McClelland, Maier & Neustadt, L.L.P.

(57) ABSTRACT

A display device includes a touch panel; a coordinate detecting unit configured to detect coordinates on a display surface of the touch panel; a special pen detecting unit configured to detect that a special pen comes into physical contact with the display surface; a timer unit configured to measure time having elapsed from when the coordinate detecting unit detects the coordinates; and an event issuing unit configured to issue a first event when the special pen detecting unit detects the special pen coming into contact with the display surface, and issue a second event when the time having elapsed measured by the timer unit exceeds a predetermined time Δt while the special pen detecting unit is not detecting the special pen coming into contact with the display surface.

3 Claims, 11 Drawing Sheets

(56) References Cited

U.S. PATENT DOCUMENTS

| | | |
|---|---|---|
| 7,847,789 B2 | 12/2010 | Kolmykov-Zotov et al. |
| 8,482,539 B2 | 7/2013 | Ogawa et al. |
| 2006/0109252 A1 | 5/2006 | Kolmykov-Zotov et al. |
| 2010/0051356 A1 | 3/2010 | Stern et al. |
| 2013/0265265 A1 | 10/2013 | Stern |

FOREIGN PATENT DOCUMENTS

| | | |
|---|---|---|
| JP | 2000-353049 | 12/2000 |
| JP | 2006-171854 | 6/2006 |
| JP | 2008-176802 | 7/2008 |
| JP | 4208681 | 10/2008 |
| JP | 2009-3575 A | 1/2009 |
| JP | 2010-224635 A | 10/2010 |

OTHER PUBLICATIONS

Office Action issued Jul. 1, 2014 in Chinese Patent Application No. 201210065832.2 (with English Translation).

Extended European Search Report issued Apr. 10, 2015 in Patent Application No. 12158701.8.

DISPLAY DEVICE WITH TOUCH PANEL, EVENT SWITCHING CONTROL METHOD, AND COMPUTER-READABLE STORAGE MEDIUM

CROSS-REFERENCE TO RELATED APPLICATIONS

The present application is a continuation Application of U.S. application Ser. No. 13/416,668, filed Mar. 9, 2012, which claims priority to Japanese Patent Application No. 2011-055228 filed in Japan on Mar. 14, 2011. The entire contents of the above-identified applications are incorporated herein by reference.

BACKGROUND OF THE INVENTION

1. Field of the Invention

The present invention relates to a display device with a touch panel, an event switching control method performed in the display device, and a computer-readable storage medium that causes a computer to execute the event switching control method.

2. Description of the Related Art

Being available in the market are products so-called "electronic whiteboards" including a large size display having a size of about 40 inches to 60 inches such as a flat panel, e.g., a liquid crystal display and a plasma display, and one using a video projector, and a touch panel mounted on the display. When a personal computer is connected to these products, such products can project an enlarged image of a screen of the personal computer thus connected, and is used for purposes such as making presentations in a meeting. Usually, these products provide "a function for operating a personal computer via a touch panel" utilizing functions of the touch panel mounted on the product so that a user can touch a projected image of the screen directly to make operations on the computer having the screen image projected, instead of making operations with a mouse. Such equipment is also provided with electronic whiteboard application software running on the personal computer to be connected to the equipment. The application software provides "functions for allowing handwriting via a touch panel", such as a function for providing a screen functioning as a whiteboard and allowing a user to handwrite letters and the like via the touch panel, and a function for capturing the screen image of the personal computer running the application and allowing the user to handwrite something over the image.

For a touch panel used in such an electronic whiteboard, an optical touch panel is often used for reasons that, for example, a large display, e.g., in a size of 50 inches, can be applied, and no film-like structure needs to be pasted on the display surface so that the image quality of a flat panel display such as a liquid crystal display and a plasma display does not deteriorate. One of characteristics of an optical touch panel is that "any pen-like stick or finger (hereinafter, referred to as a stylus) interrupting or reflecting light" can be used in touching or writing, as disclosed in Japanese Patent Application Laid-open No. 2008-176802, for example.

Such an optical touch panel determines whether a stylus is inserted into the display surface, that is, whether the stylus is brought into contact with the display surface based on whether the light (hereinafter, referred to as probe light) disposed near the display surface is interrupted or reflected by a predetermined amount during a process in which the stylus is inserted into the display surface. In other words, such a determination is made based on whether the light intensity detected by a given light receiving element reaches a predetermined threshold. When it is determined that the light intensity reaches the threshold, a touched position at that time is notified to the personal computer connected to the equipment by sending touched position information to the personal computer as a mouse event.

However, for several reasons, it is difficult, at every point across the entire display surface, to match the threshold and a position of the stylus tip in a direction perpendicular to the display surface at a moment that the stylus comes into physical contact with the display surface. The reasons include a precision in a mechanical arrangement of the light sources and the display surface, dispersion of the probe light, and dispersion of the image on the light receiving element caused by the system not always allowing the stylus to be imaged onto the light receiving element. Otherwise, extremely high mechanical precisions exceeding the practical level are required to match them.

Most conventional electronic whiteboards using an optical touch panel are designed with some margin added to the threshold, setting the threshold to a position slightly above where the stylus comes into a physical contact with the display surface. As a result, the touch panel determines that the stylus touches the display surface when the stylus is slightly above the display surface, from a position where the stylus comes into a physical contact with the display surface. A mouse event at the position is then issued.

In addition, many conventional electronic whiteboards are provided with a special stylus (hereinafter, a special pen) with a pressure sensor, for example, for detecting that the tip of the stylus is brought into physical contact with the display surface. When a special pen is used, touch coordinates are issued as a mouse event when the light is interrupted by the special pen and the pen tip comes into physical contact with the display surface and causes the pressure sensor installed at the pen tip to detect a predetermined pressure. In this configuration, coordinates are detected only when the pen tip comes into physical contact with the display surface.

As to the handwriting function via a touch panel, many electronic whiteboard applications provides a mode for drawing freehand lines or graphics objects (hereinafter, a draw mode) and a mode for deleting drawn freehand lines or graphics objects (hereinafter, an erase mode). A most popular method for switching these two modes is clicking on a menu or a button displayed in a toolbar.

Another known method is to provide the electronic whiteboard having a tray on which a pen and an eraser are placed and including a sensor for detecting that the pen and the eraser are placed on the tray, and to cause the system to determine that one of the pen and the eraser not detected by the sensor is held in hand, to switch to the draw mode when the pen is held in hand, and to switch to the erase mode when the eraser is held in hand.

Furthermore, Japanese Patent No. 4208681 discloses a technology for operating a draw mode and a personal computer in a manner described below. A drag length from a point where the pen comes into contact with the display to a point where the pen is removed from the display is measured. If the drag length measured while the draw mode is selected is longer than a threshold, the draw mode is continued. If the drag length is shorter, the mode is switched to an operation mode for allowing the personal computer to be operated. Switching from the operation mode to the draw mode is achieved by touching a button on a toolbar.

Therefore, there is a need for an electronic whiteboard capable of reducing the user's burden in switching events such as the draw mode and the erase mode of an electronic whiteboard application while operating the electronic whiteboard having a touch panel, and of eliminating the user's need to be aware of the current mode.

SUMMARY OF THE INVENTION

According to an embodiment, there is provided a display device that includes a touch panel; a coordinate detecting unit configured to detect coordinates on a display surface of the touch panel; a special pen detecting unit configured to detect that a special pen comes into physical contact with the display surface; a timer unit configured to measure time having elapsed from when the coordinate detecting unit detects the coordinates; and an event issuing unit configured to issue a first event when the special pen detecting unit detects the special pen coming into contact with the display surface, and issue a second event when the time having elapsed measured by the timer unit exceeds a predetermined time $\Delta t$ while the special pen detecting unit is not detecting the special pen coming into contact with the display surface.

According to another embodiment, there is provided an event switching control method performed in a display device with a touch panel. The event switching control method includes determining whether coordinates on a display surface of the touch panel are detected; determining whether a special pen comes into physical contact with the display surface; measuring time having elapsed from when the coordinates on the display surface are detected; and issuing a first event when the special pen comes into contact with the display surface and issuing a second event when the time having elapsed from the detection of the coordinates on the display surface exceeds a predetermined time $\Delta t$ without the special pen coming into contact with the display surface.

According to still another embodiment, there is provided a non-transitory computer-readable storage medium with an executable program stored thereon for controlling a display device with a touch panel. The program instructs a computer to perform determining whether coordinates on a display surface of the touch panel are detected; determining whether a special pen comes into physical contact with the display surface; measuring time having elapsed from when the coordinates on the display surface are detected; and issuing a first event when the special pen comes into contact with the display surface and issuing a second event when the time having elapsed from the detection of the coordinates on the display surface exceeds a predetermined time $\Delta t$ without the special pen coming into contact with the display surface.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will now be explained with reference to some drawings. In the embodiment described below, a touch panel used in an electronic whiteboard is an optical touch panel, and event switching is switching between a draw mode and an erase mode.

Figure 1:
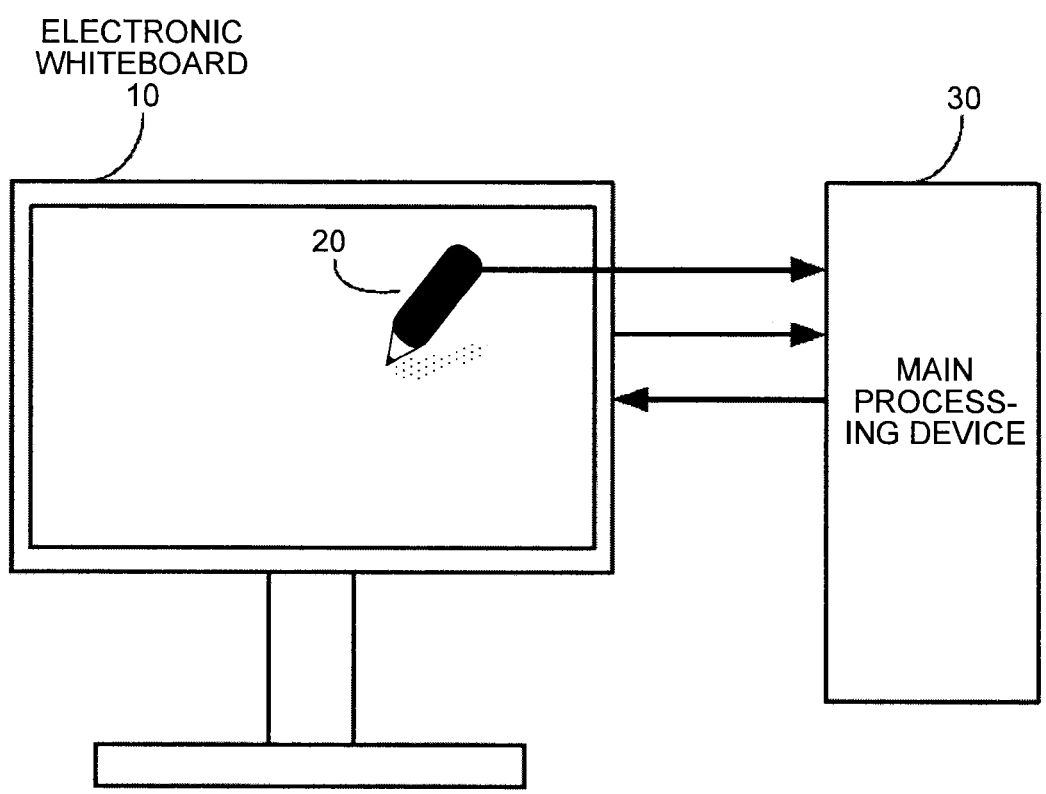
FIG. 1 is a schematic of an overall configuration of a display device with a touch panel according to the present invention.

FIG. 1 is a schematic of an overall configuration of a display device with a touch panel that is within the scope of the present invention. The display device with a touch panel includes an electronic whiteboard 10 having a touch panel (optical touch panel) mounted on the display, a special pen 20 for touching and writing on a display surface that also functions as a touch panel of the electronic whiteboard 10, and a main processing device 30 such as a personal computer. The electronic whiteboard 10 and the main processing device 30 are connected via a cable, and the special pen 20 and the main processing device 30 are connected wirelessly or over a wire. An operating unit and the like are also connected to the main processing device 30, but are omitted in FIG. 1. As will be described later, the electronic whiteboard 10 includes a coordinate detecting unit that detects coordinates on the display surface touched by a finger or the special pen 20. The special pen 20 includes a special pen pressure detecting unit that detects that the special pen 20 is pressing the display surface of the electronic whiteboard 10. The main processing device 30 stores therein various applications and an electronic whiteboard application, and provides various processing functions, operating functions, hand writing functions, and the like.

Figure 2:
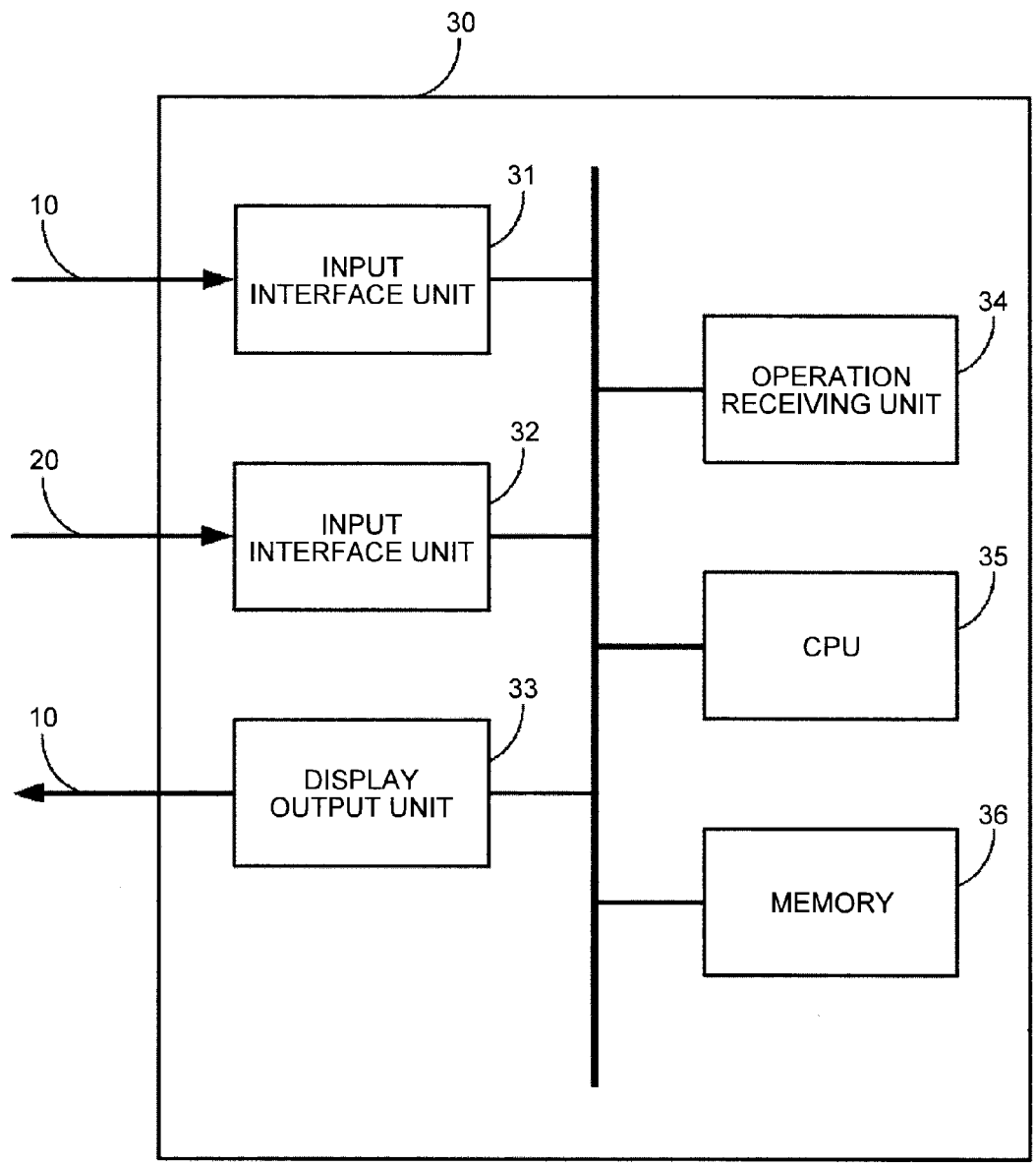
FIG. 2 is a schematic of a hardware configuration of a main processing device.

FIG. 2 is a schematic of a hardware configuration of the main processing device 30. The main processing device 30 includes an input interface unit 31 that receives signals input from the coordinate detecting unit included in the electronic whiteboard 10, an input interface unit 32 that receives signals input from the special pen pressure detecting unit included in the special pen 20, a display output unit 33 that outputs display data to the display unit included in the electronic whiteboard 10, an operation receiving unit 34 that receives a user instructions and the like from the operating unit, a central processing unit (CPU) 35 that executes various processes, and a memory 36 storing therein various types of software (the electronic whiteboard application and other applications) and data required in processes executed by the CPU 35. The memory 36 collectively refers to a random access memory (RAM), a read-only memory (ROM), a hard disk drive (HDD), and the like.

Figure 3:
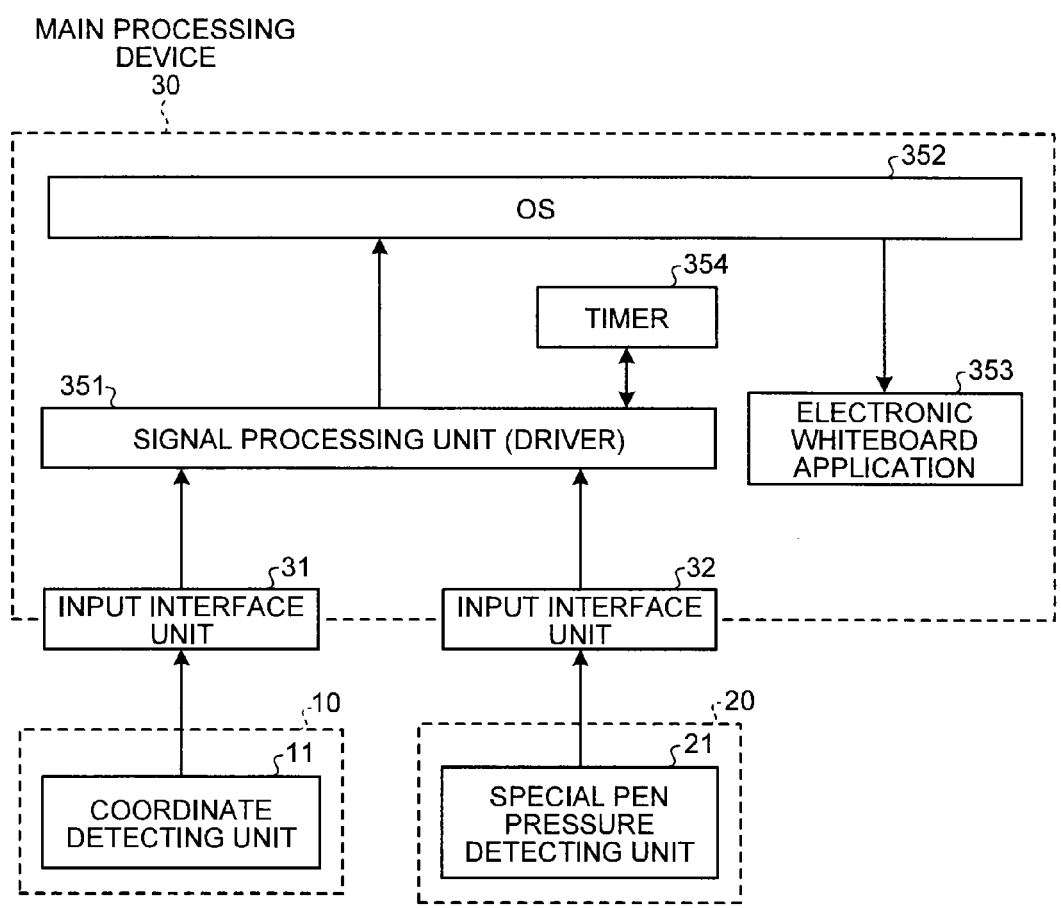
FIG. 3 is a functional block diagram of the display device with a touch panel according to the present invention.

FIG. 3 is a functional block diagram of the display device with a touch panel in illustrated in FIG. 1 related to the present invention. In FIG. 3, the electronic whiteboard 10 includes a coordinate detecting unit 11, and the special pen 20 includes a special pen pressure detecting unit 21. The main processing device 30 includes the input interface unit 31, the input interface unit 32, a signal processing unit 351, an operating system (OS) 352, an electronic whiteboard application 353, and a timer (software timer) 354. In actual operations, the signal processing unit 351, the OS 352, the electronic whiteboard application 253, and the timer 354 are executed by the CPU 35. The main processing device 30 also includes a Δt automatic setting unit which is to be described later, but the Δt automatic setting unit is omitted in FIG. 3.

The coordinate detecting unit 11 included in the electronic whiteboard 10 calculates coordinates of a stylus (the special pen) based on signals output from sensors installed in the optical touch panel, and notifies the coordinates to the input interface unit 31 included in the main processing device 30 at a predetermined rate. Different coordinate calculation methods are used depending on the configuration of the optical touch panel. For example, in one method, the coordinates are calculated using the principle of triangulation based on signals output from two sensors respectively arranged on the left side and the right side of the touch panel. In another method, a pair of a light emitting element and a light receiving element each element of which is arranged on a side opposing to the other along the perimeter of the display surface and is arranged in plurality is sequentially caused to emit/receive light, and the coordinates are calculated from the position of the pair having the light interrupted. In this embodiment, any method may be used.

An optical touch panel detects valid coordinates when the stylus is inserted into the display surface and the light is interrupted by the stylus. The coordinates and a light interruption signal are output from the coordinate detecting unit 11 at a predetermined rate, and are notified to the input interface unit 31. The light interruption signal is set to "light interruption signal=true" when the light is interrupted by a finger or the special pen 20, and is set to "light interruption signal=false" when the light is not interrupted. The coordinates are valid when the light interruption signal is true, and are invalid when the light interruption signal is false.

The special pen pressure detecting unit 21 included in the special pen 20 detects that the special pen 20 is brought into contact with the display surface, and notifies so to the input interface unit 32 included in the main processing device 30 at a predetermined rate.

Figure 4:
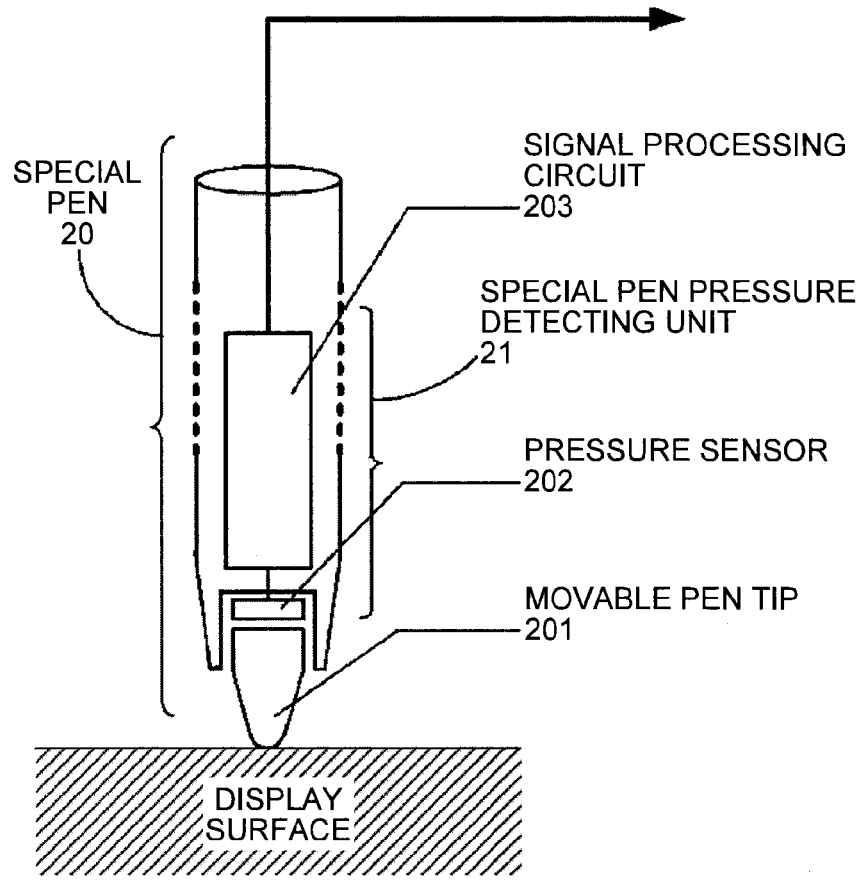
FIG. 4 is a schematic of a specific configuration of a special pen.

FIG. 4 illustrates an example of a configuration of the special pen 20 including the special pen pressure detecting unit 21. The special pen 20 includes a movable pen tip 201 disposed at the tip of the special pen 20, a pressure sensor 202, and a signal processing circuit 203 that processes a signal received from the pressure sensor 202. The movable pen tip 201 is urged by a spring, for example, not illustrated, and has a structure to push back the pressure sensor 202 with a reaction force when the movable pen tip 201 comes into contact with the display surface and a contact pressure is applied to the pen tip. The pressure sensor 202 has a resistance, for example, that changes depending on a pressure. The signal processing circuit 203 includes a conversion circuit that converts a resistance change in the pressure sensor 202 into a voltage, an analog-to-digital (A/D) conversion circuit that converts the voltage into a digital value, a storage circuit that stores therein a predetermined threshold, a threshold processing circuit that compares a signal indicating the digital value with the threshold stored in the storage circuit, and outputs true when the signal indicating the digital value exceeds the threshold and outputs false when the signal indicating the digital value does not exceed the threshold, and an output circuit that sends as a pressure signal the logical value received from the threshold processing circuit to the input interface unit 32 included in the main processing device 30 at a predetermined rate.

Alternatively, the pressure sensor 202 may be a piezo element that generates a voltage based on a pressure. In such a configuration, the circuit for converting a resistance change into a voltage is not necessary.

A signal transmitted from the special pen pressure detecting unit 21 to the input interface unit 32 of the main processing device 30 corresponds to the pressure signal described above. In other words, "pressure signal=true" when the special pen 20 comes into physical contact with the display surface, and "pressure signal=false" when not.

The signal processing unit 351 included in the main processing device 30 receives the signals output from the coordinate detecting unit 11 and the special pen pressure detecting unit 21 via the input interface unit 31 and the input interface unit 32, respectively, and outputs a mouse event of one of a draw event (first event) or an erase event (second event) depending on the status of these signals. The OS 352 receives the mouse event from the signal processing unit 351, and controls execution of an electronic whiteboard application 353. The timer 354 measures the time having elapsed from when the coordinate detecting unit 11 detects the coordinates, under the control of the signal processing unit 351. The timer 354 also measures the time during which the erase event is being issued. In other words, the timer 354 collectively represents various timer functions.

Operations performed by the signal processing unit 351, which is the central part of the present invention, will now be explained in detail. The operations of the signal processing unit 351 are generally classified into an event issuing function in which a draw event or an erase event is issued depending on the signals received from the coordinate detecting unit 11 and the special pen pressure detecting unit 21, and a cancelling function in which a change resulting from an erase event that is generated as a noise is cancelled. To begin with, the event issuing function will be explained.

Figure 5:
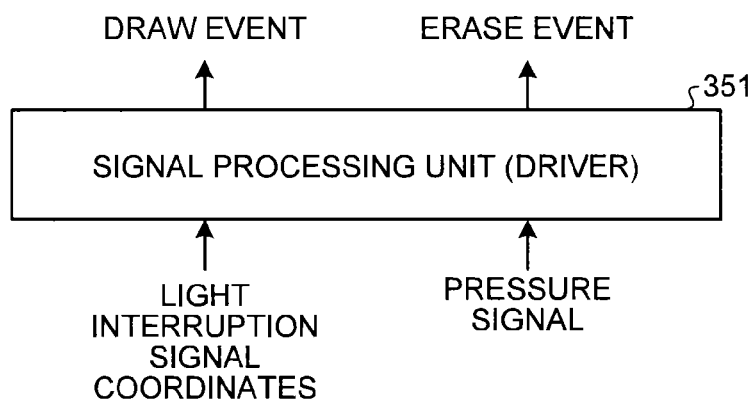
FIG. 5 is a schematic of signals input to and output from a signal processing unit.

FIG. 5 summarizes signals input to and output from the signal processing unit 351. The signal processing unit 351 receives a light interruption signal (true/false value: true if the light is interrupted, and false if the light is not interrupted), and coordinates (x and y coordinates) from the coordinate detecting unit 11 via the input interface unit 31. The signal processing unit 351 also receives a pressure signal (true/false value: true if the pen is in contact, and false if the pen is not in contact) from the special pen pressure detecting unit 21 via the input interface unit 32. The signal processing unit 351 outputs a draw event (first event) or an erase event (second event). In practice, the coordinates are contained in the draw event/erase event.

Figure 6:
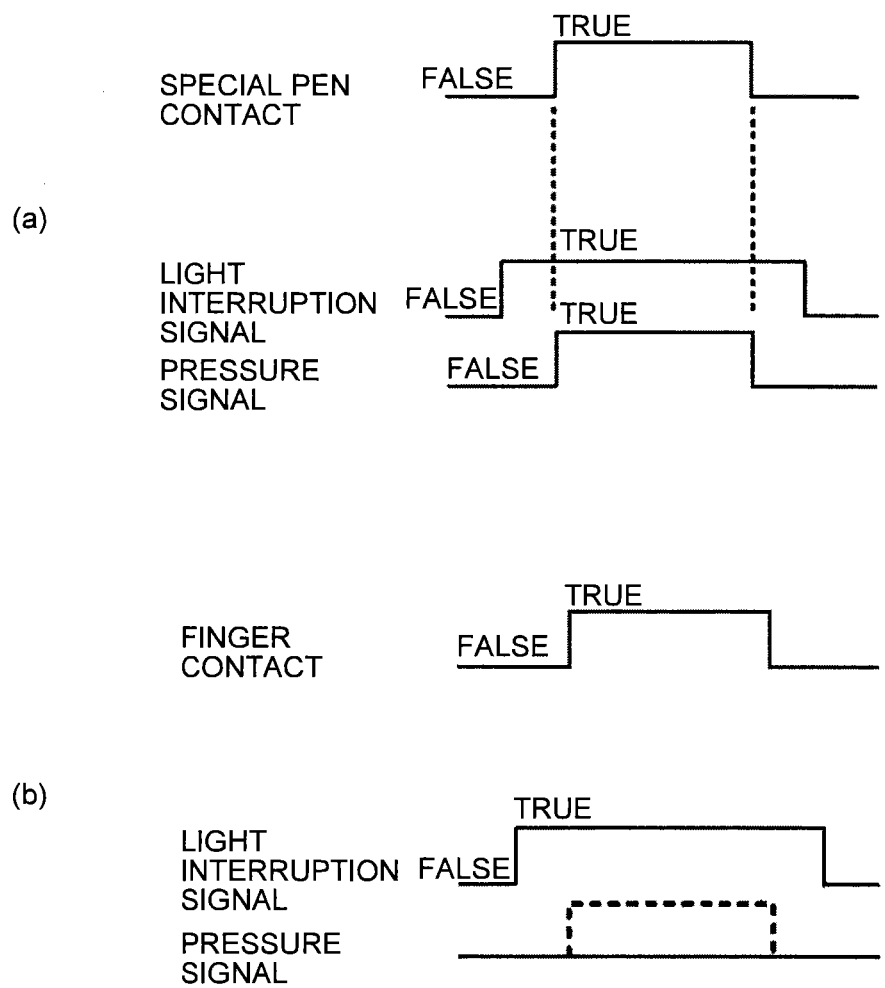
FIG. 6 illustrates timing charts of a light interruption signal output and a pressure signal output.

FIG. 6 illustrates timing charts of the light interruption signal and the pressure signal, among the signals input to the signal processing unit 351.

To begin with, explained with reference to (a) of FIG. 6 are signals input to the signal processing unit 351 when the special pen 20 touches the display surface. The "special pen contact" indicated at the top is a timing chart indicating a physical contact made by the special pen 20 with the display surface. The two charts located below are a timing chart indicating a light interruption signal input to the signal processing unit 351 from the coordinate detecting unit 11, and a timing chart indicating the pressure signal input to the signal processing unit 351 from the special pen pressure detecting unit 21. A rise in these charts represents true, and a drop represents false.

The light interruption signal is a true/false signal indicating timing at which the probe light is interrupted. Generally, in an optical touch panel, the probe light is interrupted at timing earlier than the timing the special pen 20 actually comes into contact with the display surface. When the probe light is interrupted, the light interruption signal is set to true. At the same time as the probe light is interrupted, a coordinate signal of that time is calculated. The pressure signal is a true/false signal issued by the special pen pressure detecting unit 21. Based on the operations of the pressure sensor 202, a true/false value is input to the signal processing unit 351 in synchronization with the special pen 20 coming into a physical contact with the display surface.

On the contrary, when a finger is used to touch the display surface, the probe light is interrupted and the light interruption signal is set to true, but the pressure signal is not set to true and is kept false, as illustrated in (b) of FIG. 6.

Figure 7:
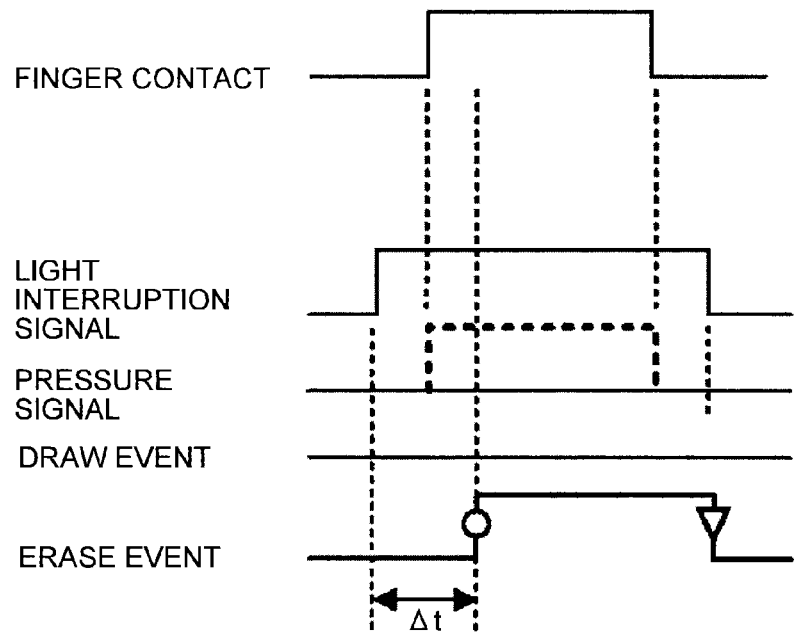
FIG. 7 is a first schematic for explaining operations of the signal processing unit.
Figure 8:
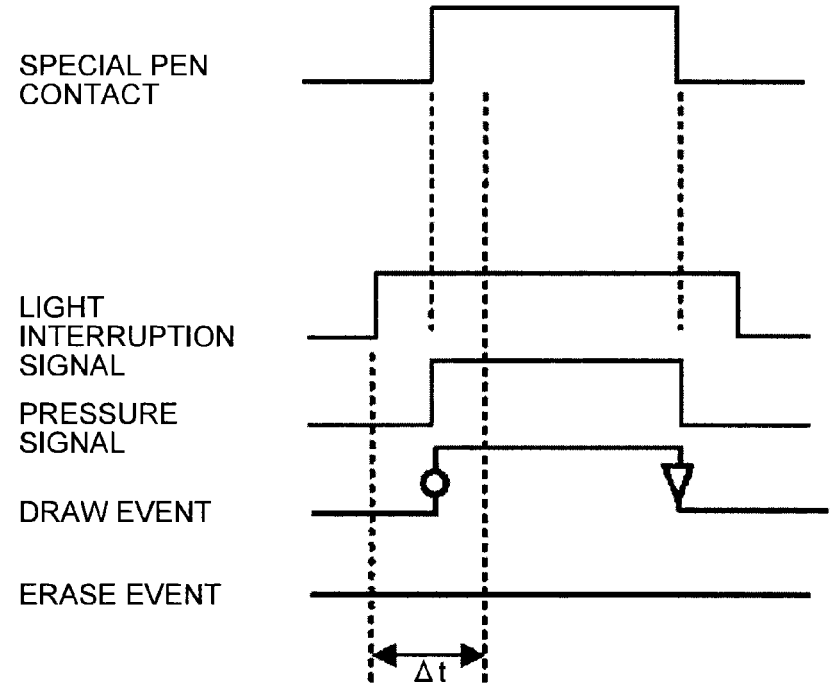
FIG. 8 is a second schematic for explaining the operations of the signal processing unit.
Figure 9:
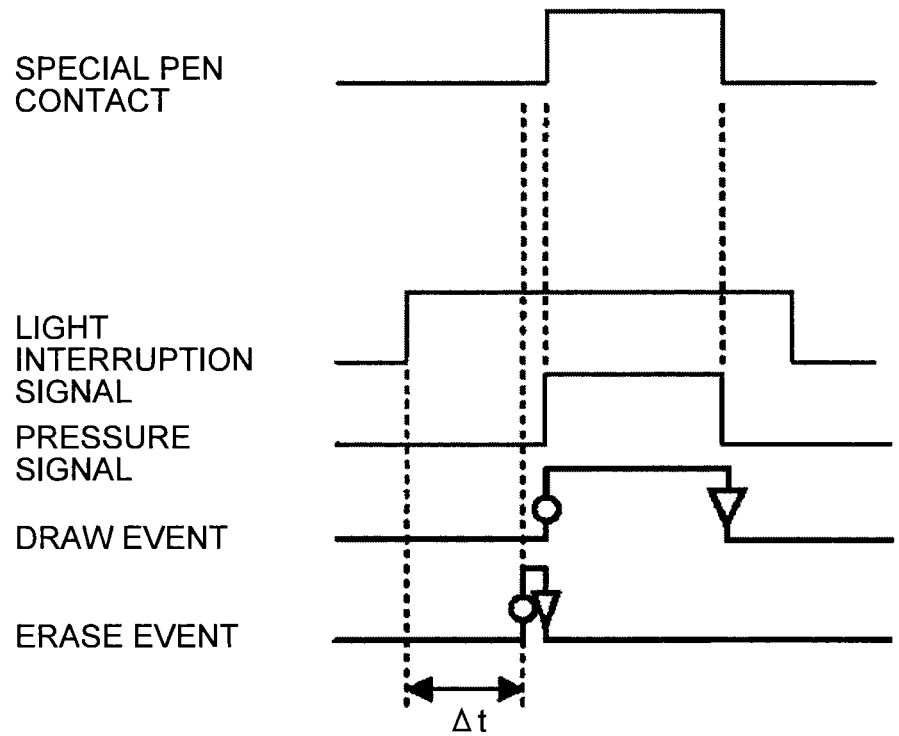
FIG. 9 is a third schematic for explaining the operations of the signal processing unit.

The signal processing unit 351 follows different operation patterns illustrated in FIGS. 7 to 9 depending on the light interruption signal and the pressure signal.

FIG. 7 illustrates an operation performed when the light interruption signal is received but the pressure signal is not received (when the pressure signal is not set to true). When the pressure signal is not set to true and the light interruption signal is kept true although a predetermined time Δt elapses from when the light interruption signal is received, an erase event is output at a point in time when the time Δt elapses. In other words, FIG. 7 represents an example in which the finger is used to touch the display surface, and therefore, the pressure signal does not change to true. In this example, the erase event is ended at the timing the light interruption signal is set to false.

FIG. 8 illustrates an operation performed when the pressure signal is set to true before the predetermined time Δt elapses from when the light interruption signal is received. When the pressure signal is set to true before the predetermined time Δt elapses from when the light interruption signal is received, a draw event is issued at the timing the pressure signal is set to true. A draw event is issued at a point in time indicted by a circle in FIG. 8. FIG. 8 represents an example in which the time having elapsed from when the special pen 20 touches the display surface and the light interruption signal is set to true to when the pen tip comes into contact with the display surface and the pressure signal is set to true is shorter than Δt. In this situation, the draw event is ended at the timing the pressure signal changes from true to false.

FIG. 9 illustrates an operation performed when the pressure signal is set to true after the predetermined time Δt elapses from when the light interruption signal is received. In other words, FIG. 9 represents an example in which the special pen 20 is used to touch the display surface, and the time having elapsed from when the light interruption signal is set to true to when the pen tip comes into contact with the display surface and the pressure signal is set to true is longer than Δt. In this example, an erase event is generated instantaneously, and, at the time the pressure signal is set to true, the erase event is ended and a draw event is issued. The draw event is then ended at the time the pressure signal changes to false.

Figure 10:
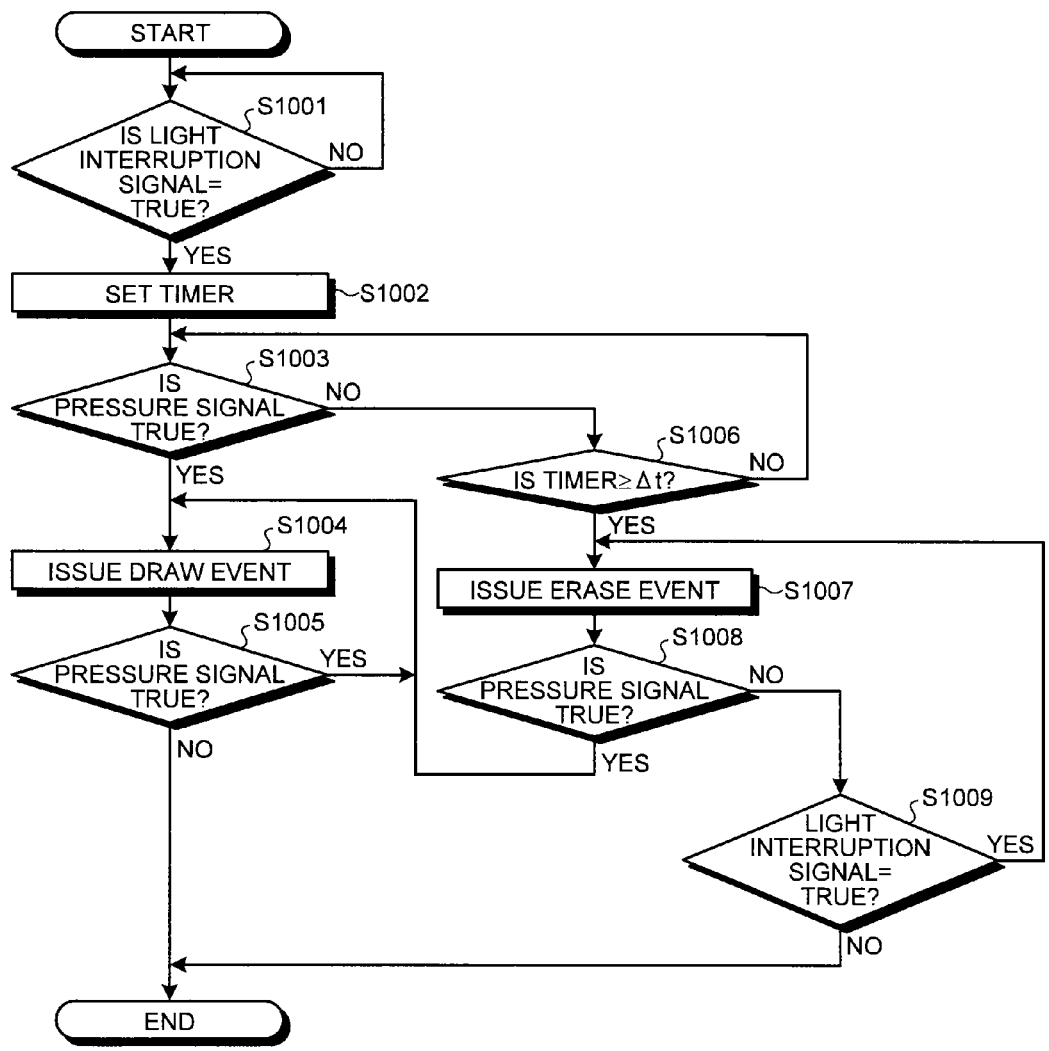
FIG. 10 is a flowchart of a process performed by the signal processing unit.

FIG. 10 is a flowchart of a process for realizing the event issuing function of the signal processing unit 351. Each of the operation modes illustrated in FIGS. 7 to 9 are realized by this process.

The signal processing unit 351 waits until the light interruption signal is received (Step S1001). If the light interruption signal is received (light interruption signal=true), the timer is set, and is caused to start counting (Step S1002). The signal processing unit 351 then determines if the pressure signal is received from the special pen 20 (Step S1003).

If the pressure signal is received (pressure signal=true), the signal processing unit 351 issues a draw event (Step S1004). After the draw event is issued, the signal processing unit 351 monitors the pressure signal again (Step S1005), and as long as the pressure signal=true, the signal processing unit 351 keeps issuing the draw event. If the pressure signal is no longer received, the signal processing unit 351 stops issuing the draw event, and ends the operation. The signal processing unit 351 then returns to the start.

On the contrary, if the pressure signal is not received, the signal processing unit 351 obtains the count value from the timer, and determines if the count value has reached the predetermined time Δt (Step S1006). If the count value has not reached Δt, the system control returns to Step S1003. If the count value has reached Δt, the signal processing unit 351 issues an erase event (Step S1007), and observes if the pressure signal is received (Step S1008). If the pressure signal is received, the signal processing unit 351 issues a draw event (Step S1004). Operations performed thereafter are the same as those performed when pressure signal is received described above. If the pressure signal is not received, the signal processing unit 351 determines the status of the light interruption signal (Step S1009). As long as the light interruption signal=true, the signal processing unit 351 keeps issuing the erase event. If the light interruption signal is no longer received, the signal processing unit 351 stops issuing the erase event, and ends the operation. The signal processing unit 351 then returns to the start.

The cancelling function of the signal processing unit 351 will now be explained. The cancelling function is a function for cancelling an erase event generated as a noise, when the pressure signal changes to true after the predetermined time Δt elapses from when light interruption signal is received (FIG. 9). There are two approaches for determining whether an erase event is a noise. The first approach is to determine all erase events issued before the pressure signal is set to true to be noises when the pressure signal is set to true after Δt elapses from when light interruption signal is received. The second approach is to measure the time during which an erase event is being issued, and to determine the erase event to be a noise when such time is equal to or less than a predetermined time Δt1. To cancel an erase event that is determined to be a noise, the last drawing condition (last display content) needs to be stored when the erase event is issued, and once the pressure signal is set to true and the event is switched to a draw event, the drawing condition before the erase event is issued needs to be restored.

Figure 11:
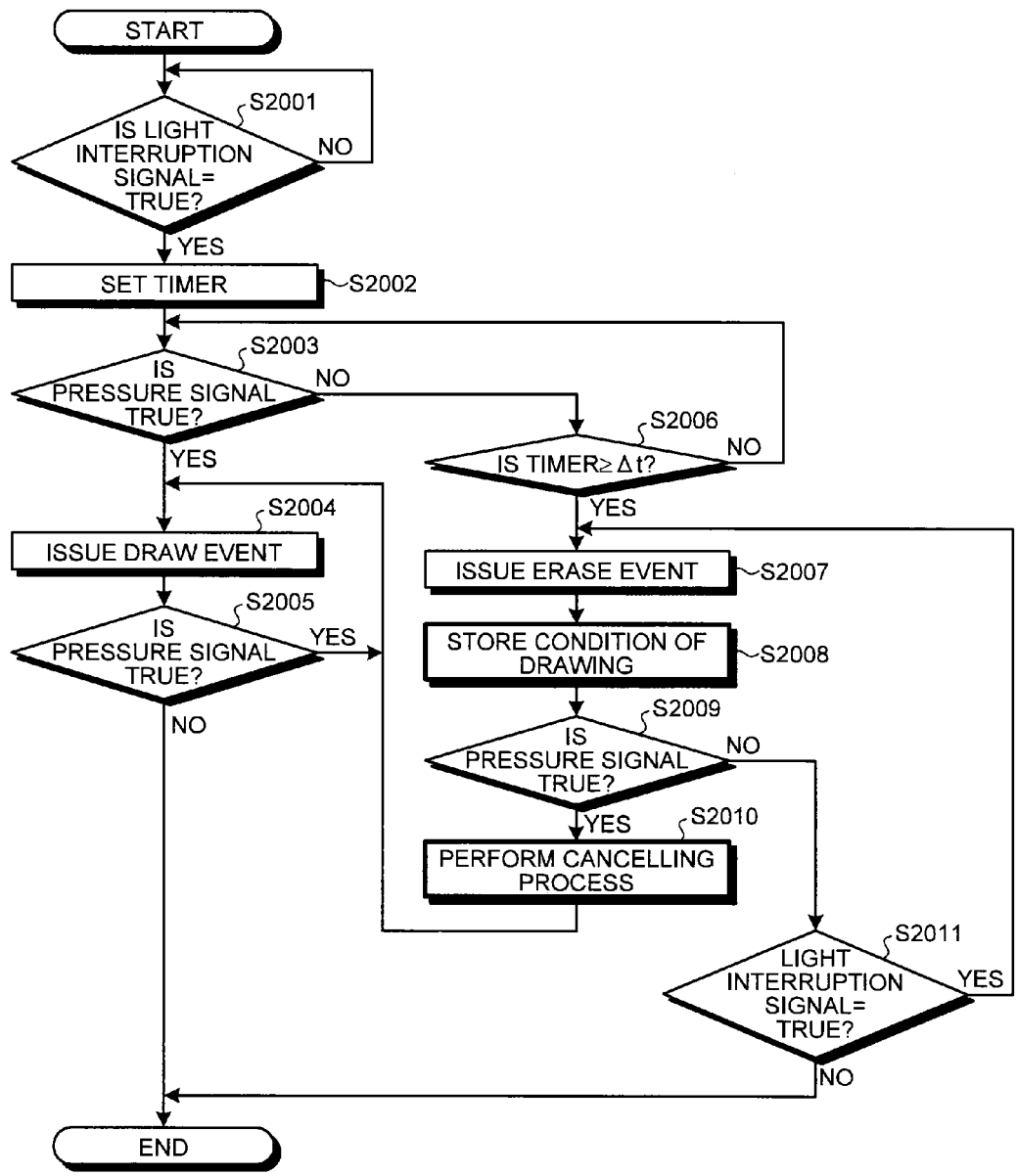
FIG. 11 is a flowchart of a process performed by the signal processing unit when an erase event the cancelling function is added.

FIG. 11 is a flowchart of a first process performed by the signal processing unit 351 when the erase event cancelling function is added. In this process, the signal processing unit 351 determines if an erase event is a noise using the first approach. In FIG. 11, the steps surrounded by thick lines are added to the process illustrated in the flowchart of FIG. 10.

The signal processing unit 351 issues an erase event when the predetermined time Δt elapses from when the light interruption signal is received while the pressure signal is not received (Step S2007). At this time, the last condition is stored (Step S2008). If the pressure signal is not received thereafter but the light interruption signal is received, the system control returns to issuing of an erase event, and the last condition is stored in the same way (Steps S2009, S2011, S2007, and S2008). If the pressure signal is then received (Step S2009), the signal processing unit 351 restores the current drawing condition to the stored condition, in other words, the signal processing unit 351 cancels all of the erase events issued after Δt has elapsed (Step S2010), and issues a draw event (Step S2004).

Figure 12:
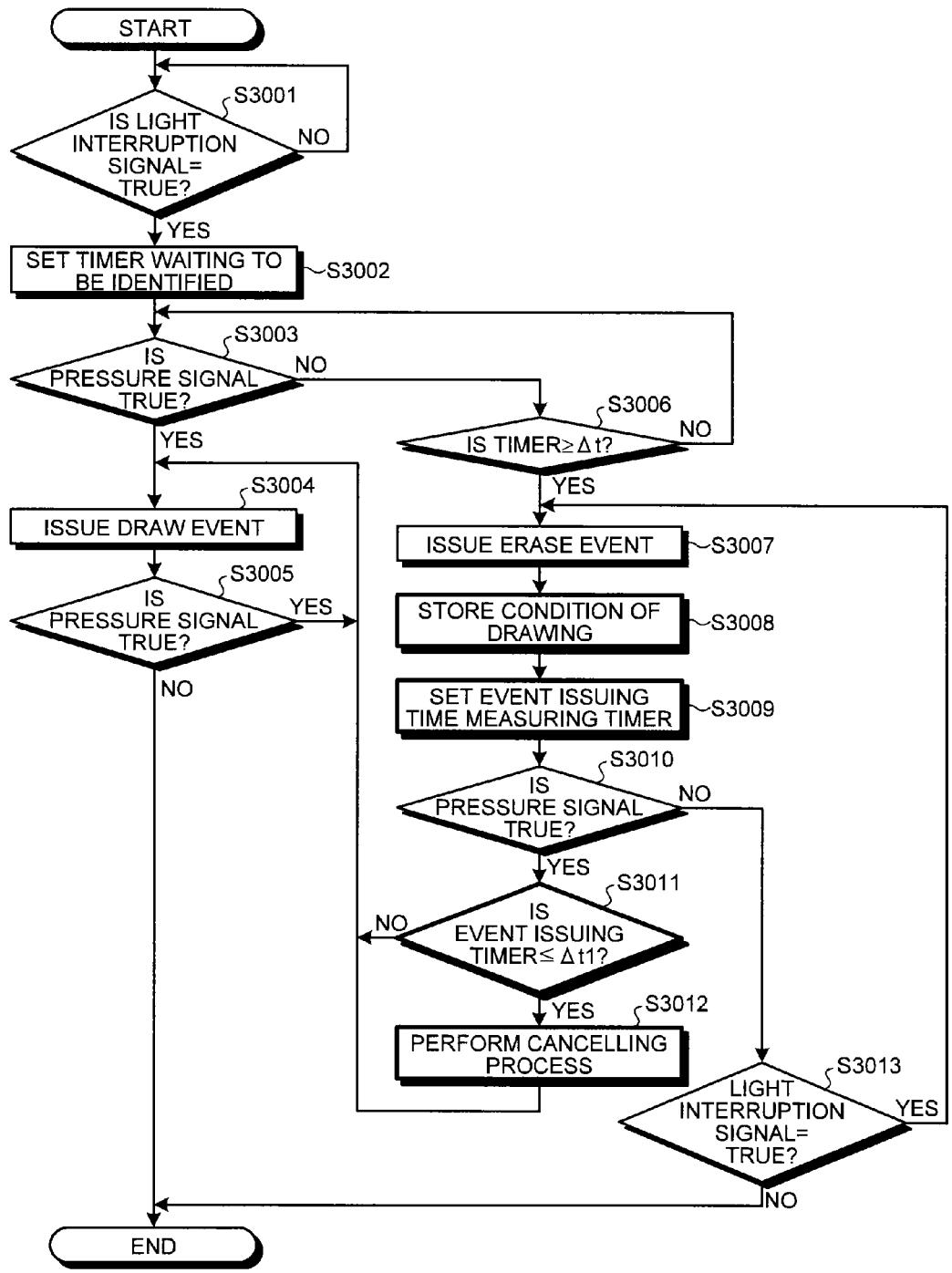
FIG. 12 is a flowchart of another process performed by the signal processing unit when the erase event cancelling function is added.

FIG. 12 is a flowchart of a second process performed by the signal processing unit 351 when the cancelling function is added. In this process, the signal processing unit 351 determines if an erase event is a noise using the second approach. In FIG. 12, the steps surrounded by thick lines are added to the process illustrate in the flowchart of FIG. 10. In FIG. 12, the timer is classified into a timer waiting to be identified and an event issuing time measuring timer.

The signal processing unit 351 issues an erase event when the predetermined time Δt elapses from when the light interruption signal is received and the pressure signal is not received (Step S3007). At this time, the last condition is stored (Step S3008), and the event issuing time measuring timer is set, and caused to start measuring the time during which the erase event is issued (Step S3009). If the pressure signal is received subsequently (Step S3010), the signal processing unit 351 further determines if the erase event issuing time is equal to or less than the predetermined time Δt1 (Step S3011). If the event issuing time is equal to or less than Δt1, the signal processing unit 351 restores the current drawing condition to the stored drawing condition via a cancelling process (Step S3012), and issues a draw event (Step S3004). On the contrary, if the erase event issuing time is longer than Δt1, the system control directly goes to issuing of a draw event. The other steps are the same as those illustrated in FIG. 11.

Explained below is how the predetermined time Δt is set. A noise generated when pressure signal is set to true after the predetermined time Δt elapses from when the light interruption signal is received (an erase event generated as a noise) (FIG. 9) is in a tradeoff relationship with usability. In other words, when Δt is increased, generation of a noise is reduced, but the usability is reduced as well. On the contrary, if Δt is reduced, the usability is improved but a noise might be generated frequently. Therefore, it is necessary to set an appropriate Δt. Possible ways to set Δt include allowing a user to specify a given time (milliseconds), and allowing the main processing device 30 to specify Δt automatically.

When Δt is set by a user, the operation receiving unit 34 (FIG. 2) receives Δt input via an operating unit and the like, and stores Δt in a memory and the like. In other words, the operation receiving unit 34 functions as a setting unit that enables a user to set a given Δt.

When Δt is automatically set by the main processing device 30, a Δt automatic setting unit (function) is included in the main processing device 30, and automatically updates Δt depending on usage conditions.

Figure 13:
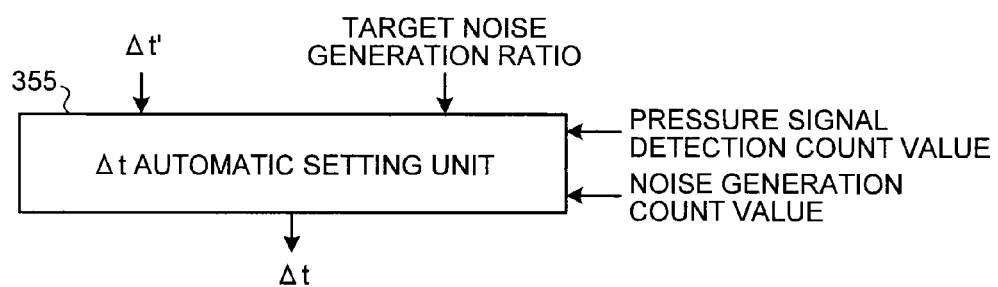
FIG. 13 is schematic of information input to and output from a $\Delta t$ automatic setting unit.

FIG. 13 illustrates information input to and output from a Δt automatic setting unit 355. In FIG. 13, Δt' represent a prior Δt. The initial value of Δt ° may be any value, and may be specified by a user. The target noise generation ratio is a noise generation ratio that is given as a target in advance. The pressure signal detection count value is the number of times the pressure signal is detected, and is the number of times the pressure signal is set to true at Steps S2003 and S2009 in FIG. 11, or the number of times the pressure signal is set to true at Steps S3003 and S3010 in FIG. 12, for example. The noise generation count value is the number of times a noise is generated, and is the number of times the pressure signal is set to true at Step S2009 in FIG. 11, or the number of times yes matches at Step S3011, e.g., the number of times the cancelling process is performed in FIG. 12, for example. The pressure signal detection count value and the noise generation count value are counted and stored in a memory and the like by the signal processing unit 351.

The Δt automatic setting unit 355 obtains the pressure signal detection count value and the noise generation count value from the memory and the like, calculates the noise generation ratio, compares the noise generation ratio with the target noise generation ratio, and updates Δt' to a new Δt.

A noise generation ratio is a ratio of the number of noises generated to the number of times the display surface is touched with the pen, and is calculated by the equation below.

Noise Generation Ratio=Noise Generation Count value/Pressure Signal Detection Count value The number of times the display surface is touched with the pen is equivalent of the number of times the pressure signal is detected, that is, equivalent of the number of times a draw event (first event) is issued.

Figure 14:
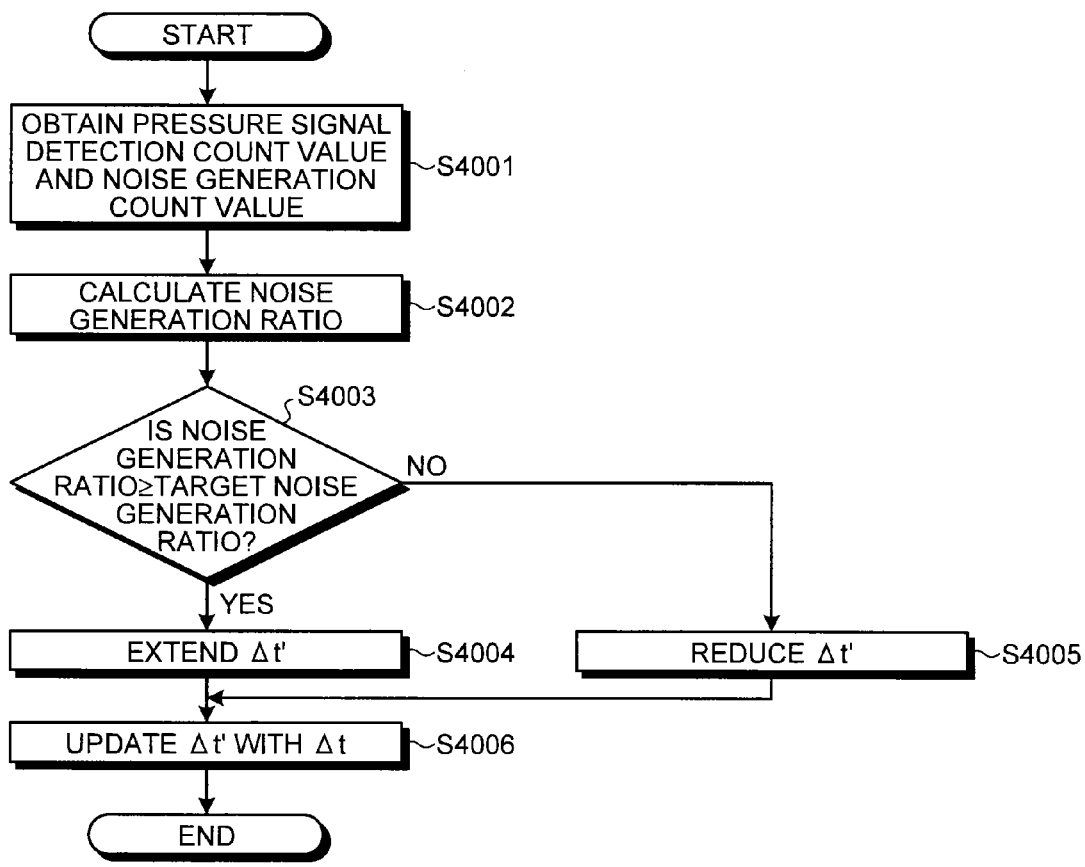
FIG. 14 is a flowchart of a process performed by the $\Delta t$ automatic setting unit.

FIG. 14 is a flowchart of a process performed by the Δt automatic setting unit 355. To begin with, the Δt automatic setting unit 355 obtains the pressure signal detection count value and the noise generation count value (Step S4001), and calculates the noise generation ratio (Step S4002). The Δt automatic setting unit 355 then compares the noise generation ratio thus calculated with the target noise generation ratio (Step S4003). If the noise generation ratio is equal to or higher than the target noise generation ratio, Δt' is corrected to a higher value (Step S4004), and the value is set as a new Δt (Step S4006). On the contrary, if the noise generation ratio is lower than the target, Δt' is corrected to a lower value (Step S4005). By performing this process every time the pressure signal is detected, Δt can be updated automatically.

One embodiment of the present invention is explained above. However, it should be needless to say that the present invention may also be realized by configuring processing units such as the signal processing unit and the Δt automatic setting unit as computer programs and by causing a computer to execute the computer programs, or by configuring processes performed by such processing units as computer programs and by causing a computer to execute the computer programs. It is also possible to store and provide the computer programs for realizing processing functions of the processing units or computer programs for causing a computer to execute such processes in a manner recorded in a computer-readable recording medium such as a flexible disk (FD), a magneto-optical (MO) disk, a random access memory (ROM), a memory card, a compact disk (CD), a digital versatile disk (DVD), and a removable disk, as well as to distribute the computer program over a network such as the Internet.

Modes Other than Draw Mode and Erase Mode

In the embodiment, event switching is performed between a draw mode and an erase mode, and a draw mode is selected when an operation is made using a special pen, and an erase mode is selected when an operation is made using an instrument other than the special pen (e.g., a finger). However, the present invention is also effective for switching between other modes used in the electronic whiteboard application installed in the main processing device, and can provide a mode switching in which burden of switching modes is reduced and a user is not required to be aware of the current mode. Furthermore, the same advantageous effects can be achieved by reversing the mode applied to the operation made with the special pen to the mode applied to the operation performed with an instrument other than the special pen.

Examples of modes (events) used in the electronic whiteboard application include those listed below. Draw mode: a mode for allowing a freehand drawing Draw mode with a pen color designation
Draw mode with a pen color designation (black)
Draw mode with a pen color designation (blue)
. . .
Draw mode with a pen thickness designation
Draw mode with a pen thickness designation (1 point)
Draw mode with a pen thickness designation (2 point)
. . .
Draw mode with a transparency designation
Draw mode with a transparency designation $\alpha=0.1$
Draw mode with a transparency designation $\alpha=0.2$
. . .
Erase mode: a mode for erasing a freehand line
Select mode: a mode for selecting a freehand line About Touch Panel In the embodiments, an example of the optical touch panel is explained. However, the present invention is not limited thereto. As long as the touch panel is provided with a mechanism for detecting that the special pen comes into physical contact with the display surface, the present invention may be applied to a touch panel of following types, for example.

Resistive type
Surface acoustic wave type (ultrasonic type)
Surface capacitive type
Projected capacitive type Provided that a conductive special pen needs to be used for the surface capacitive type and the projected capacitive type.

In the embodiments, the first event such as a draw mode is issued when the special pen comes into physical contact with the display surface. If coordinates on the display surface are detected without the special pen coming into physical contact with the display surface, a predetermined time is waited without issuing the second event such as the erase mode immediately. If the special pen coming into physical contact with the display surface is not detected although the predetermined time elapses, the second event such as an erase mode is issued. If the special pen coming into physical contact with the display surface is detected before the predetermined time elapses, the first event such as the draw mode is issued.

According to the embodiments, while an electronic whiteboard including a display device with a touch panel is being operated, if an operation is made with the special pen, the first event such as the draw mode is selected. If an operation is made using an object other than the special pen (e.g., a finger), the second event such as the erase mode is selected. Therefore, the user's burden in switching events can be reduced, and events can be switched without requiring the user to be aware of the current mode.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device, comprising:
   processing circuitry configured to detect that a pen comes into physical contact with a display based on a pressure signal received from the pen, issue a first event when detecting the pen coming into contact with the display, and issue a second event when a predetermined time has elapsed while not detecting the pen coming into contact with the display, wherein
   the processing circuitry is further configured to cancel a change applied by the second event when issuing the first event due to the detection of the pen coming into contact with the display after the second event is issued.

2. The device according to claim 1, wherein the processing circuitry is further configured to cancel the change applied by the second event when issuing the first event due to the detection of the pen coming into contact with the display after the second event is issued and when a time during which the second event is issued is shorter than a predetermined time.

3. The display device according to claim 2, wherein
   the processing circuitry stores therein a last display content when the second event is issued, and restores a current display to the stored display content when issuing the first event due to the detection of the pen coming into contact with the display after the second event is issued.

* * * * *